US007128117B2

(12) United States Patent
Currie et al.

(10) Patent No.: US 7,128,117 B2
(45) Date of Patent: Oct. 31, 2006

(54) EXPANDABLE TIRE BUILDING DRUM WITH ALTERNATING FIXED AND EXPANDABLE SEGMENTS, AND CONTOURS FOR SIDEWALL INSERTS

(75) Inventors: William Dudley Currie, Stow, OH (US); Emile Reding, Kehmen (LU); John Kolbjoern Roedseth, Bissen (LU)

(73) Assignee: The Goodyear Tire + Rubber Company, Akron, OH (US)

( * ) Notice: Subject to any disclaimer, the term of this patent is extended or adjusted under 35 U.S.C. 154(b) by 176 days.

(21) Appl. No.: 10/828,362

(22) Filed: Apr. 20, 2004

(65) Prior Publication Data

US 2004/0194892 A1    Oct. 7, 2004

Related U.S. Application Data

(62) Division of application No. 09/960,215, filed on Sep. 21, 2001, now Pat. No. 6,863,106.

(51) Int. Cl.
   *B29D 30/24* (2006.01)
(52) U.S. Cl. ........................ 156/417; 156/414
(58) Field of Classification Search ............... 156/414, 156/417–419; 249/180
   See application file for complete search history.

(56) References Cited

U.S. PATENT DOCUMENTS

| | | | |
|---|---|---|---|
| 1,479,005 A | 1/1924 | Pearson | |
| 1,669,532 A | 5/1928 | Myers | |
| 2,628,652 A | 2/1953 | Orr | |
| 3,002,875 A * | 10/1961 | Trevaskis | ................ 156/417 |
| 3,160,546 A | 12/1964 | Burton | |
| 3,178,331 A | 4/1965 | Bishop et al. | |
| 3,207,648 A | 9/1965 | Shilts | |
| 3,375,154 A | 3/1968 | Ruttenberg et al. | |

(Continued)

FOREIGN PATENT DOCUMENTS

DE     1240267     5/1967

(Continued)

OTHER PUBLICATIONS

U.S. Appl. No. 09/957,785, filed Sep. 21, 2001, Zeh et al.

(Continued)

*Primary Examiner*—Geoffrey L. Knable
(74) *Attorney, Agent, or Firm*—Howard M. Cohn

(57) ABSTRACT

An expandable tire building drum, having alternating fixed (226, 326, 426) and expanding (228, 328, 428) segments (e.g., 24 of each) in a center section (220, 320, 420) of the drum. The expanding segments are axially-extending and circumferentially spaced from one another, and are contoured (have recesses, or grooves) to accommodate tire components such as sidewall inserts. Two different mechanisms for expanding the center section are described. A first mechanism includes two wedge elements (358) which are axially moveable away from one another to expand the center section. Ramp elements (348) associated with the expanding segments (328) may thus be moved radially outward. Rubber bands (358) provide a restoring force for collapsing the center section. A second mechanism includes two guide rings (458) which are axially moveable towards one another for expanding the center section, and away from one another to collapse the center section. Overlapping links (462, 464) are provided between the guide rings and a support element (448) supporting the expanding segments (428).

10 Claims, 9 Drawing Sheets

U.S. PATENT DOCUMENTS

| | | | |
|---|---|---|---|
| 3,418,192 A * | 12/1968 | Nädler | 156/401 |
| 3,547,733 A | 12/1970 | Leblond | |
| 3,645,828 A | 2/1972 | Balle et al. | |
| 3,654,025 A | 4/1972 | Winzer et al. | |
| 3,676,260 A | 7/1972 | Appleby et al. | |
| 3,779,835 A | 12/1973 | Lohr et al. | |
| 3,837,968 A | 9/1974 | Marra | |
| 3,929,546 A | 12/1975 | Katagiri et al. | |
| 3,971,694 A | 7/1976 | Gazuit | |
| 4,010,059 A | 3/1977 | Yabe | |
| 4,126,507 A | 11/1978 | Kim et al. | |
| 4,220,494 A | 9/1980 | Kawaida et al. | |
| 4,243,451 A | 1/1981 | Kortman | |
| 4,381,331 A | 4/1983 | Johnson | |
| 4,392,899 A | 7/1983 | Bertoldo | |
| 4,416,720 A | 11/1983 | Baldoni | |
| 4,427,473 A | 1/1984 | Shichman et al. | |
| 4,436,574 A | 3/1984 | Long et al. | |
| 4,854,612 A | 8/1989 | Cubric et al. | |
| 4,855,008 A | 8/1989 | Terrado | |
| 4,929,298 A | 5/1990 | Van Der Peol et al. | |
| 4,976,804 A | 12/1990 | Kneip | |
| 5,047,108 A | 9/1991 | Byerley | |
| 5,066,354 A | 11/1991 | Benjamin | |
| 5,203,947 A | 4/1993 | Boeker | |
| 5,232,542 A * | 8/1993 | Norjiri et al. | 156/417 |
| 5,264,068 A | 11/1993 | Masuda | |
| 5,320,701 A | 6/1994 | Jellison et al. | |
| 5,322,587 A | 6/1994 | Kondo et al. | |
| 5,547,538 A | 8/1996 | Siegenthaler | |
| 5,591,288 A | 1/1997 | Becker et al. | |
| 6,058,999 A | 5/2000 | Roberts et al. | |
| 6,059,910 A | 5/2000 | Siegenthaler | |
| 6,235,135 B1 | 5/2001 | Sergel et al. | |
| 2003/0051817 A1 * | 3/2003 | Sawada | 156/403 |

FOREIGN PATENT DOCUMENTS

| | | |
|---|---|---|
| DE | 1263287 | 3/1968 |
| DE | 27 06 586 | 8/1978 |
| EP | 0634266 | 1/1995 |

OTHER PUBLICATIONS

U.S. Appl. No. 09/960,211, filed Sep. 21, 2001, Currie et al.

* cited by examiner

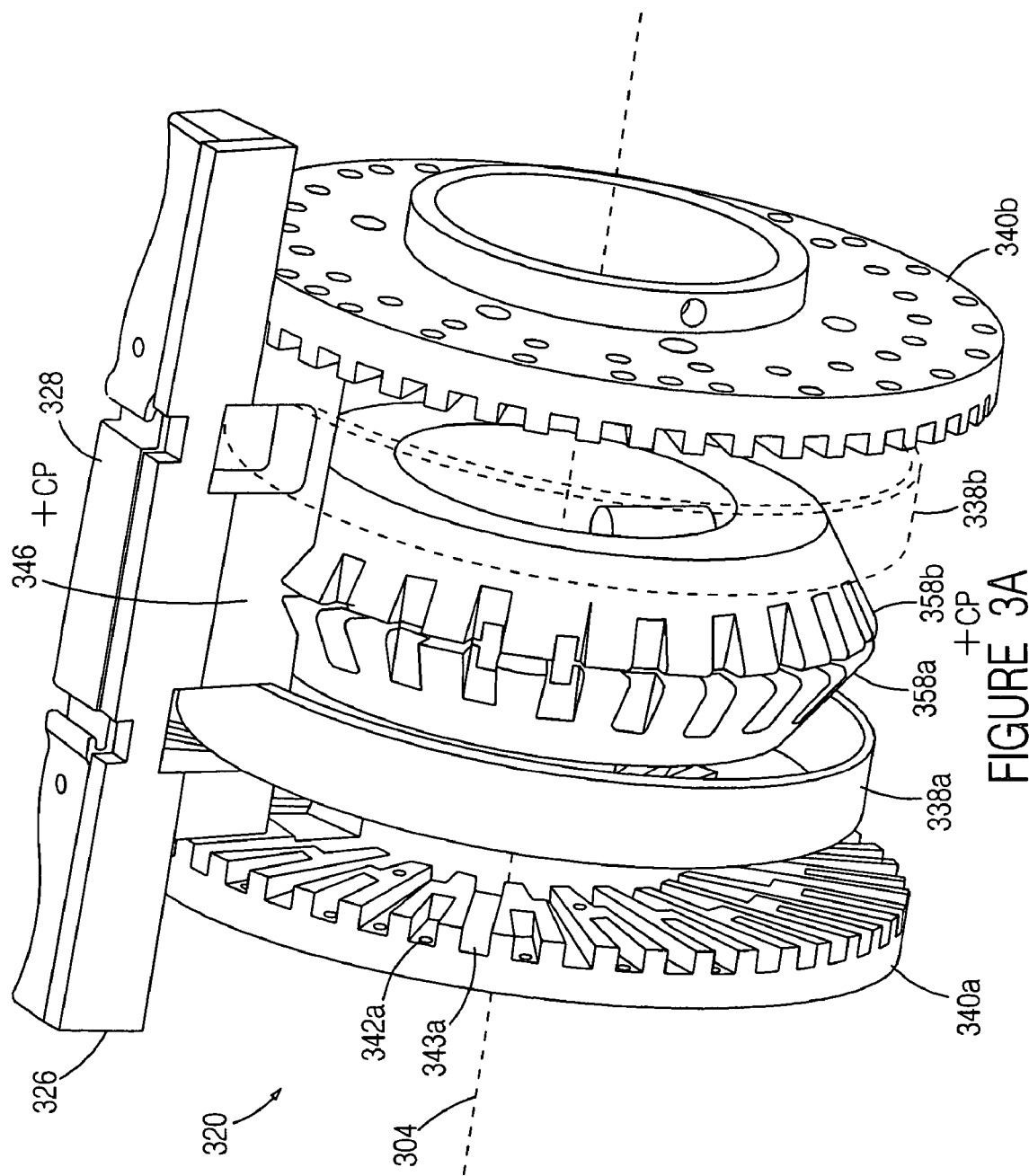

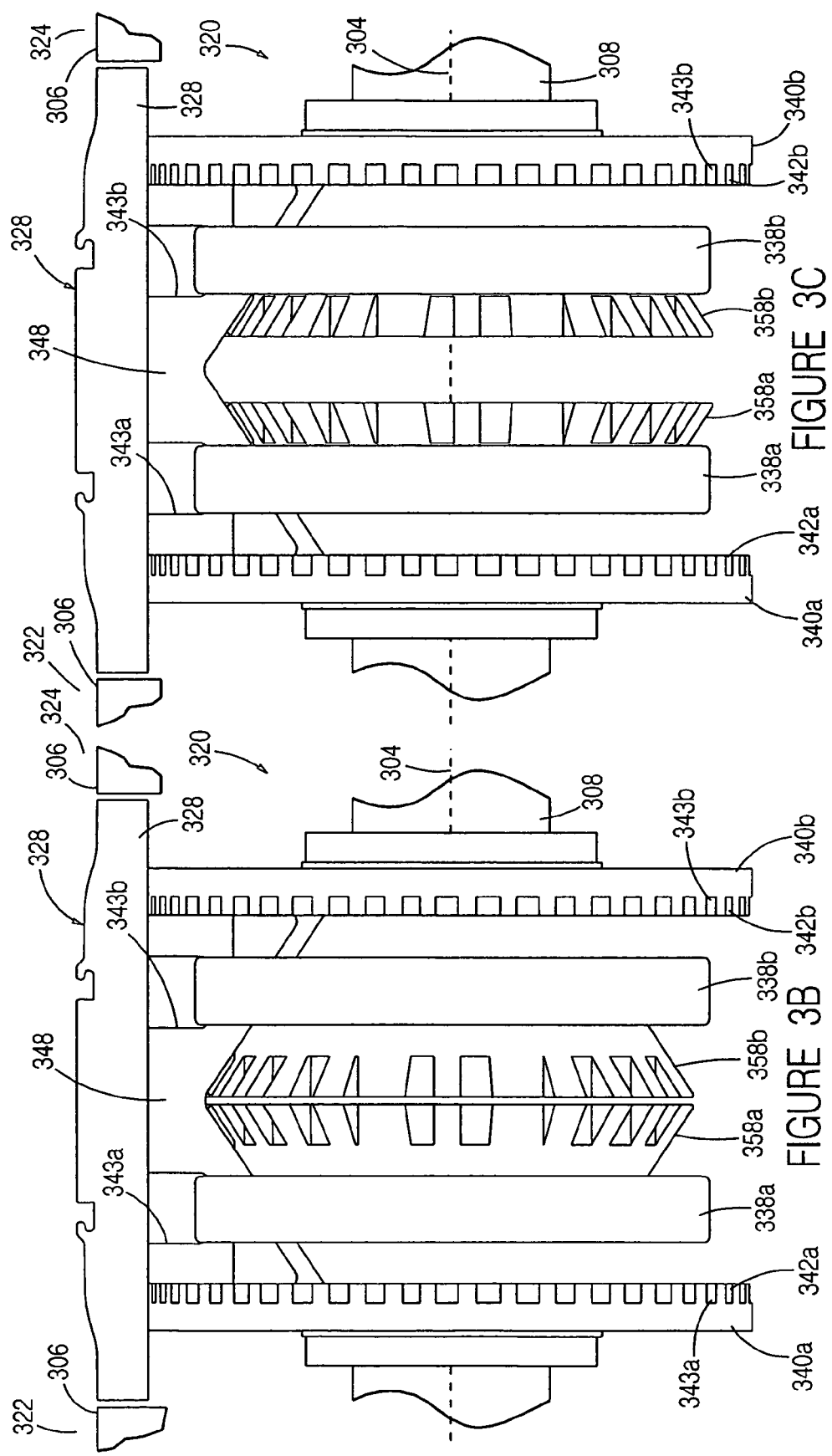

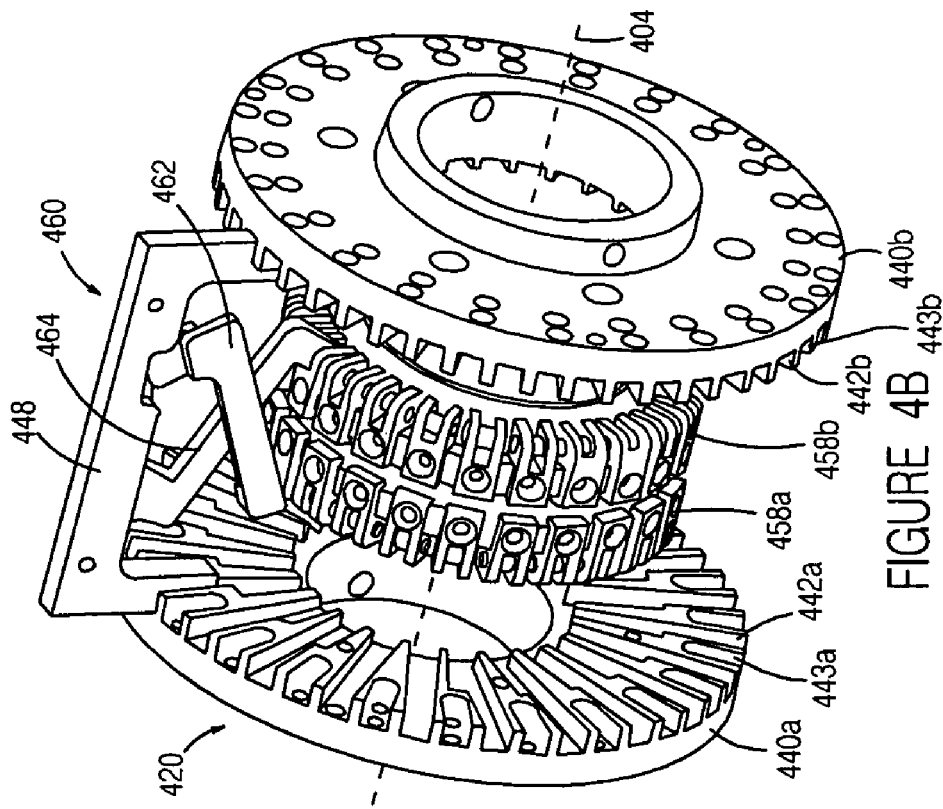
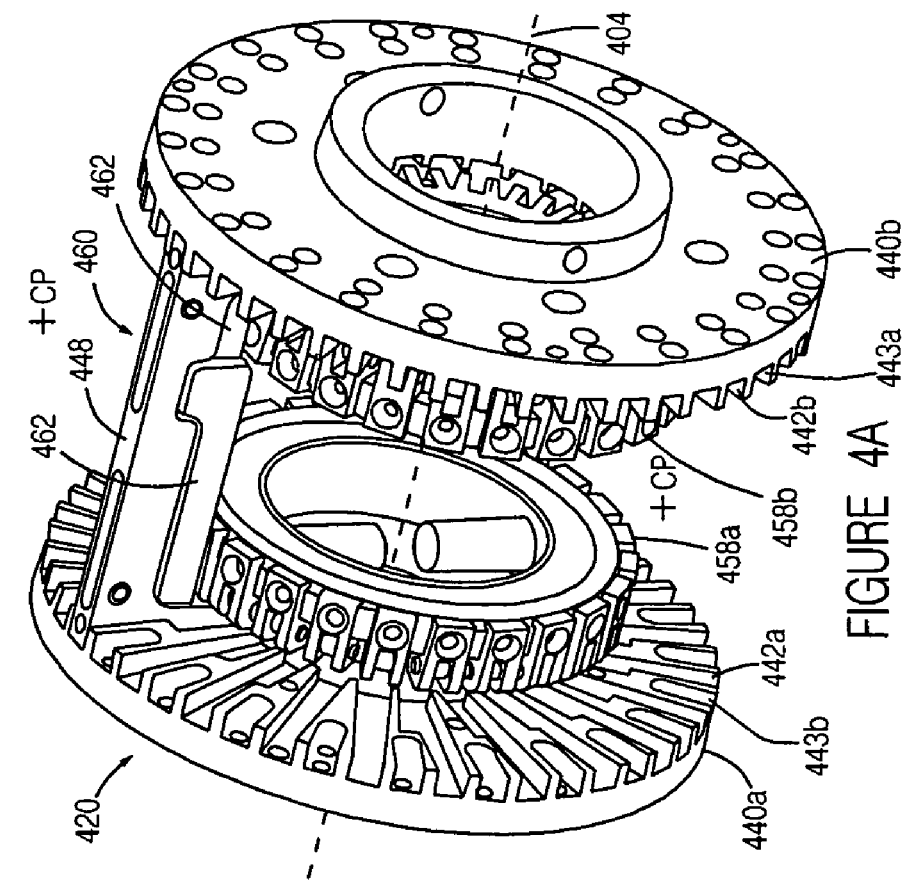

EXPANDABLE TIRE BUILDING DRUM WITH ALTERNATING FIXED AND EXPANDABLE SEGMENTS, AND CONTOURS FOR SIDEWALL INSERTS

CROSS-REFERENCE TO RELATED APPLICATIONS

This is a Divisional application of U.S. application Ser. No. 09/960,215, now U.S. Pat. No. 6,863,106, having a filing date of Sep. 21, 2001 and a common assignee with present application.

This application relates to U.S. patent application Ser. No. 09/960,211 entitled TIRE BUILDING DRUM HAVING EXPANDABLE CENTER SECTION AND INDEPENDENTLY EXPANDABLE BEAD LOCK ASSEMBLIES IN THE END SECTIONS, filed on Sep. 21, 2001.

TECHNICAL FIELD OF THE INVENTION

The present invention relates to tire building drums for laying up tire carcasses, more particularly to drums which are expandable between a collapsed position and an expanded position.

BACKGROUND OF THE INVENTION

It is known that in making vehicle tires, for example for automobiles, that manufacture of a so-called carcass is first achieved by successively assembling several different components. In other words, the different carcass types included in a production range can be distinguished from one another depending on the presence thereon of the various accessory components and/or the typology of the accessory components themselves.

By way of example, when carcasses for tubeless tires are to be produced, that is tires that in use do not require the presence of an inner tube, the main components can be considered to include a so-called inner liner that is a layer of elastomeric air-impervious material, a carcass ply, a pair of annular metal elements, commonly referred to as bead cores, around which the opposite ends of the carcass ply are folded as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire nonuniformity problems including static imbalance and radial force variations. For example, a tire which is not meridionally symmetric (e.g., tread not centered between beads) can cause a variety of tire nonuniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel.

Although certain degrees of tire nonuniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical tire building machines comprise a tire building drum around which the tire components are wrapped in successive layers including, for example, an innerliner, one or more carcass plies, optional sidewall stiffeners and bead area inserts (e.g., apex), sidewalls and bead wire rings (beads). After this layering, the carcass ply ends are wrapped around the beads, the tires are blown up into a toroidal shape, and the tread/belt package is applied.

Commonly-owned U.S. Pat. No. 5,591,288 (hereinafter referred to as "Becker") discloses mechanical tire building drums for building extended mobility pneumatic tires, and more specifically to a tire building drum having contours or depressions in its surface to facilitate building certain tire designs. Attention is also directed to corresponding published European Patent Application No. 0 634 266 A2.

As noted by Becker, tire performance can be affected by adding components to the tire or by adjusting the location of tire components in the tire during the tire building process. During the tire building process, it is important that components fit together well with a minimum of wrinkling of the tire components or trapping of air between the components. If air is trapped between the uncured tire components, the tire may be defective and may have to be scrapped. During the tire building process, if it appears the air has been trapped between tire components, the tire builder must stitch the interfaces between the uncured elastomeric components to work any bubbles or trapped air from between the components. This stitching involves rolling a roller wheel along the components, forcing the air to an edge of a component where it can escape. The stitching process is time consuming and requires the skill of the tire builder.

As further noted by Becker, this problem is further magnified in tire designs where components are rather thick compared to other components. For example, when a component having a relatively square cross-section, such as a tire bead, is positioned adjacent a more planar component, such as a ply, the air may be trapped where the different-shaped components interface. In tire designs where different-shaped components are necessarily placed next to each other, the problem of trapped air is even more difficult.

As further noted by Becker, in one particular extended mobility tire design, inserts are positioned in the sidewall between the carcass plies to enable the tire to support the weight of the vehicle even if the tire should lose inflation pressure. These inserts are typically thicker than the plies which lie adjacent to them and it is important that this tire be built without trapping air between the plies and inserts. In accordance with the present invention, an inventive tire building method and drum have been designed which have features to accommodate the special production needs of such tires. These special features will be described hereinafter and contribute to the building of a quality tire without trapping air.

Becker therefore provides a method of building a tire comprising the steps of forming a liner into a cylinder, positioning first inserts to indent the liner cylindrical surface circumferentially at axially spaced insert locations along the axis of the cylinder, laying a first ply of reinforcing material around the cylindrical surface of the liner and first insert, positioning second inserts over the first ply at the spaced insert locations, laying a second ply of reinforcing material over the first ply and the second inserts, positioning circular beads at each end of the cylinder, expanding the first ply and the second ply to increase the diameter of the cylinder between the circular beads to provide shoulders at each end of the cylinder, turning edges of the first ply around the second ply over each of the beads, and positioning a belt and tread assembly around the second ply to form a precured tire.

Becker further provides a method of assembling tire components on a tire building drum having a cylindrical surface comprising the steps of laying a liner on the surface of the drum, positioning first inserts below the cylindrical surface and around a drum at insert locations spaced from each end of the drum, laying a first ply of reinforcing material around the drum over the cylindrical surface of the liner and first insert, positioning second inserts over the first ply at the insert locations spaced from each end of the drum, laying a second ply of reinforcing material over the first ply and the second inserts, positioning circular beads at each end of the drum, expanding the drum to increase the diameter of the cylindrical surface and provide shoulders at each end of the drum, turning edges of the first ply and the second ply over each of the beads, positioning a belt and tread assembly around the second ply, and contracting the drum for removal of the assembled tire components from the drum.

Becker further provides a tire building drum which has a cylindrical surface, circular grooves in the surface at insert locations spaced from each end of the drum for positioning of first inserts below the surface, means for applying a first ply over the cylindrical surface, means for applying second inserts over the first ply and the first inserts, means for applying a second ply over the first ply and second insert, means for expanding the drum providing shoulders at each end of the drum for applying bead rings, means for turning up ends of the first ply around the beads, means for applying a belt and tread assembly around the second ply and means for contracting the drum to remove the assembled tire from the drum.

Commonly-owned U.S. Pat. No. 4,855,008 discloses an expandable tire building drum, especially a first stage solid pocket drum for building a carcass of a radial tire, having a segmental drum (10) with a plurality of axially-extending, circumferentially spaced segments (36) with flexible connections (56) to shoulder pistons (32) at opposite ends of each segment (36). Wedge shaped bars (62) are positioned between the segments (36) and are connected to center pistons (64) for urging tapered side faces (80) of the bars into engagement with sloping side faces (78) of the segments (36). The shoulder pistons (32) and center pistons (64) move radially outward to expand the drum. During the first stage operation, the tire reinforcing plies, beads and other components are assembled on the first stage drum and then the carcass is moved to another location where it is shaped and the belt and tread applied. In the first stage assembly of the tire carcass it is important that the tire components be applied to contracted and expanded drum surfaces which are concentric and of uniform diameter along the length of the drum. Expandible drums of different constructions have been used heretofore; however it has been difficult to maintain a concentric drum surface and a uniform diameter along the length of the drum in both the expanded and contracted condition of the drum. For example, the drum surface may be concentric and uniform in the contracted condition but is distorted during expansion to a larger diameter. As a result, the components added to the carcass on the expanded drum are not precisely assembled which may adversely affect the uniformity of the tire.

U.S. Pat. No. 5,264,068 discloses an expandable drum including adjustable stops for setting drum circumference. Tapering structures, each having axial slidability, are provided, and in response to a slide move of the tapering structure, drum segments are each radially expanded or retracted. As noted therein, the tapering structure (12) is of an inner recessed frustum and is mounted over the drum shaft (10) longitudinally or axially slidable with the aid of a key (16), and housed in the drum (14). The drum (14) is circumferentially divided into a plurality of drum segments (17), each being like a sector, and each segment (17) is interiorly supported by a drum segment supporter (18).

Commonly-owned U.S. Pat. No. 4,976,804 discloses an expandable, segmental tire building drum (1) having a plurality of circumferentially spaced drum segments (28) radially movable by a set of links (36) pivotally connected to a pair of axially movable hub assemblies (34) slidably mounted on a drum shaft (12). Each of the segments (28) has a cylindrical center portion (30) and end portions (32) with recesses providing pockets (68) for the tire bead portions. The links (36) are positioned between the end portions (32) providing space for large bead portions in the pockets (68) and at the same time the segments (28) are retractable to a small diameter to facilitate placing of a tire band (64) over the drum (10).

Commonly-owned U.S. Pat. No. 4,929,298 discloses a tire building drum including an expandable segmental cylinder assembly and a vacuum Chamber. The drum (10) has a plurality of axially-extending, circumferentially spaced segments (18). The ends of the drum are sealed to provide a vacuum chamber (76) inside the drum which is in communication with vacuum holes (78) in a cover sleeve (48) to hold tire components on the drum surface (58) during assembly of the tire components.

BRIEF SUMMARY OF THE INVENTION

According to the invention, an expandable tire building drum has alternating fixed and expanding segments (e.g., 24 of each) in a center section of the drum. The expanding segments are axially-extending and circumferentially spaced-apart from one another, and their end portions are contoured (have recesses, or grooves) to accommodate tire components such as sidewall inserts. Two different mechanisms for expanding the center section are described.

A first mechanism includes two wedge elements which are axially moveable away from one another to expand the center section. Ramp elements associated with the expanding segments may thus be moved radially outward. Biasing elements provide a restoring force for collapsing the center section.

A second mechanism includes two guide rings which are axially moveable towards one another for expanding the center section, and away from one another to collapse the center section. Overlapping links are provided between the guide rings and a base member supporting the expanding segments.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
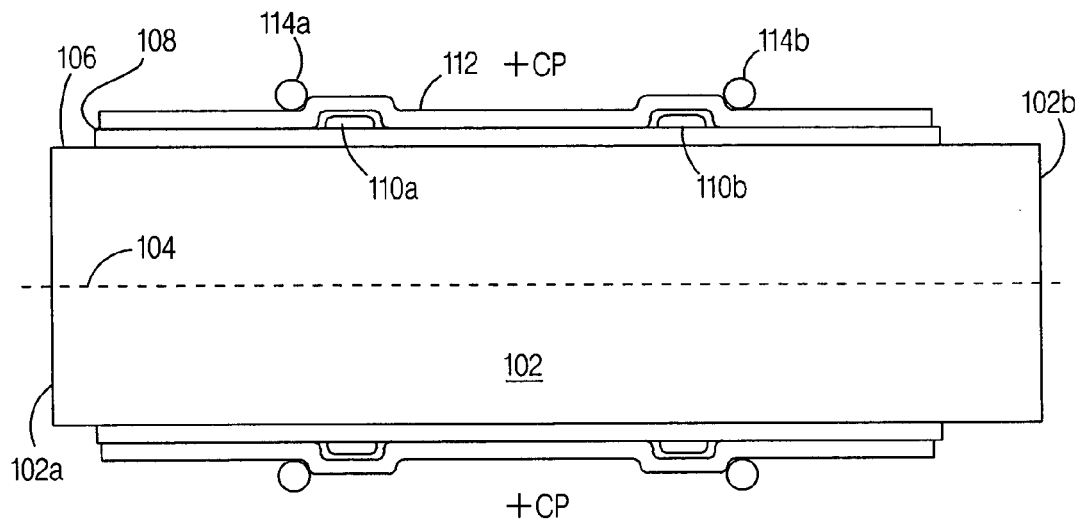

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract. Sometimes, similar elements are referred to with the suffixes -L and -R (e.g., 133L, 133R), which generally indicate left and right, as viewed in the drawing.

Figure 1B:
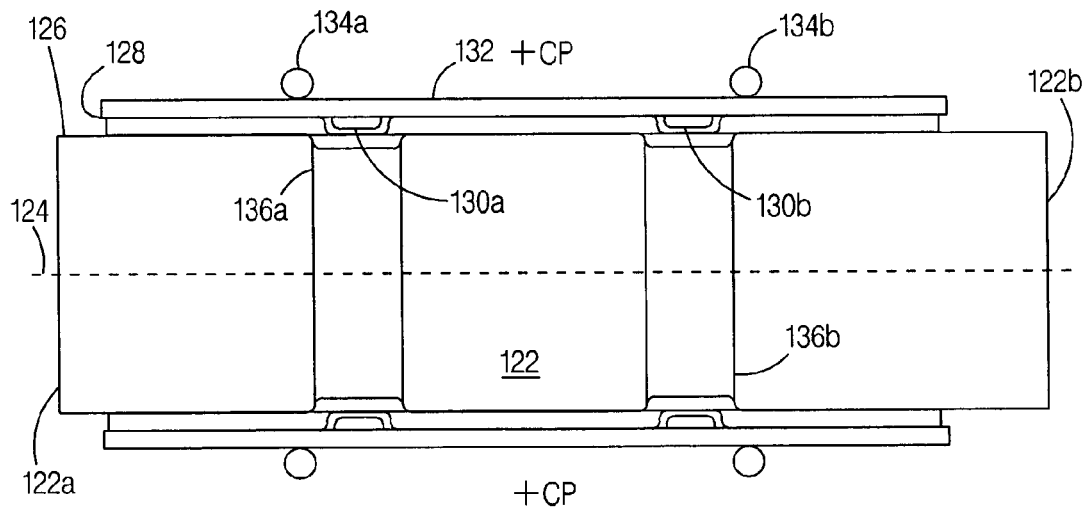
Figure 2A:
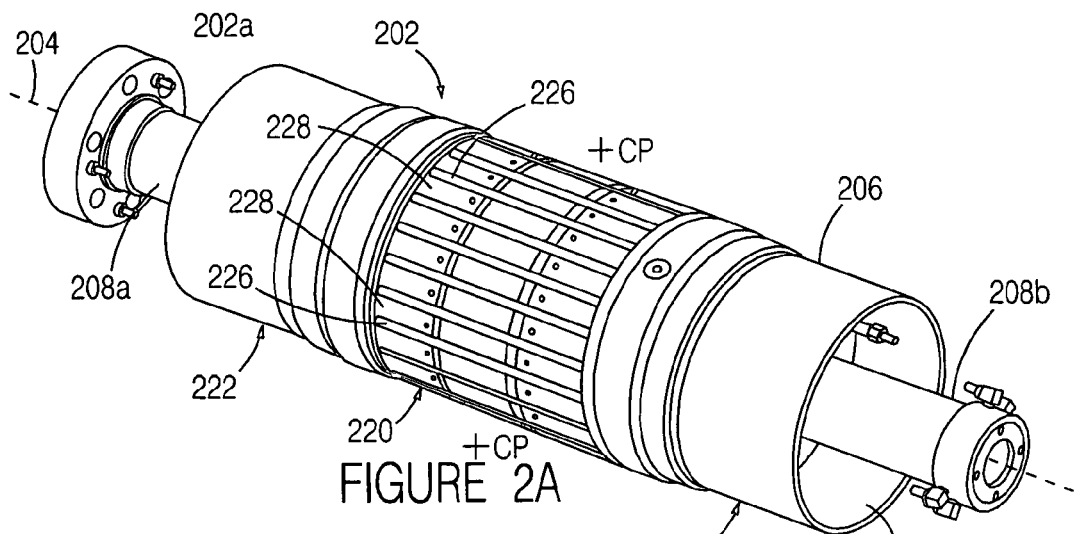
Figure 2B:
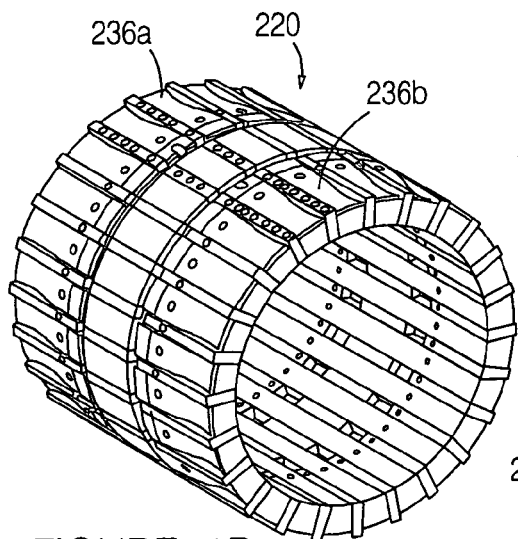
Figure 2D:
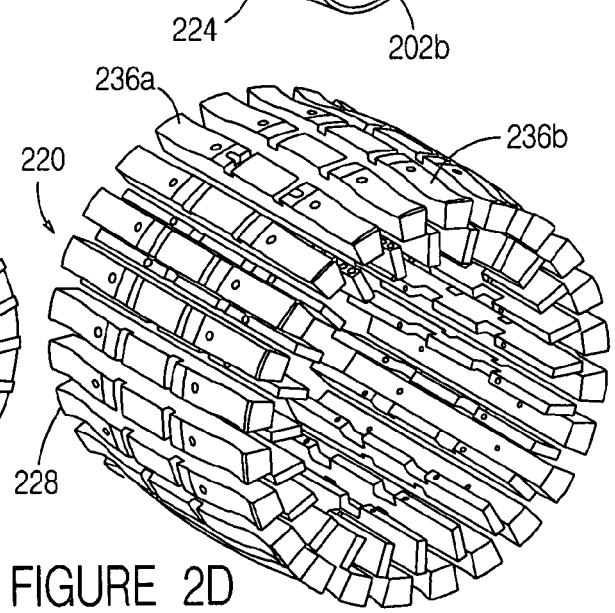
Figure 2C:
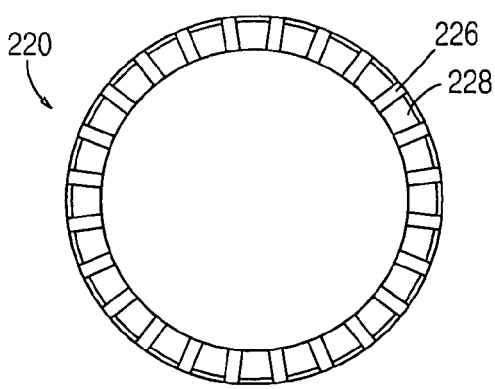
Figure 2E:
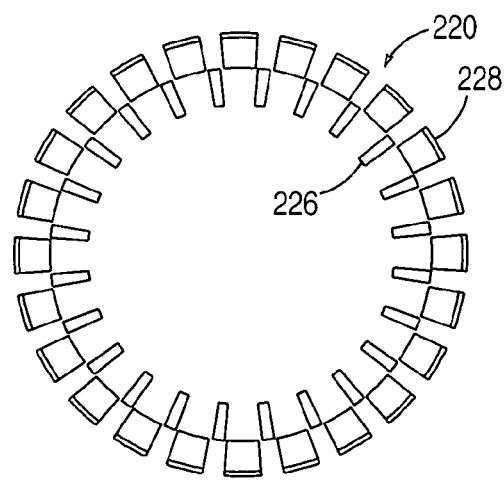
Figure 2F:
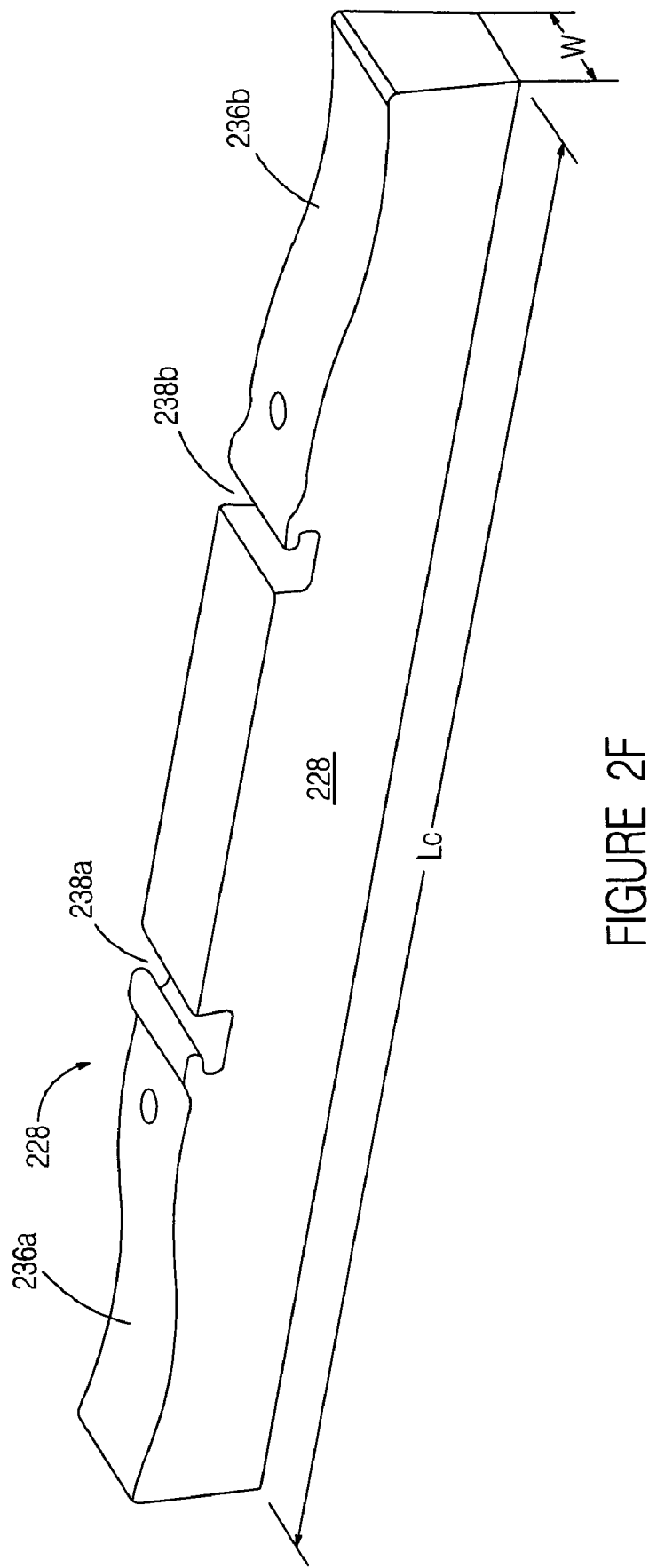
Figure 3D:
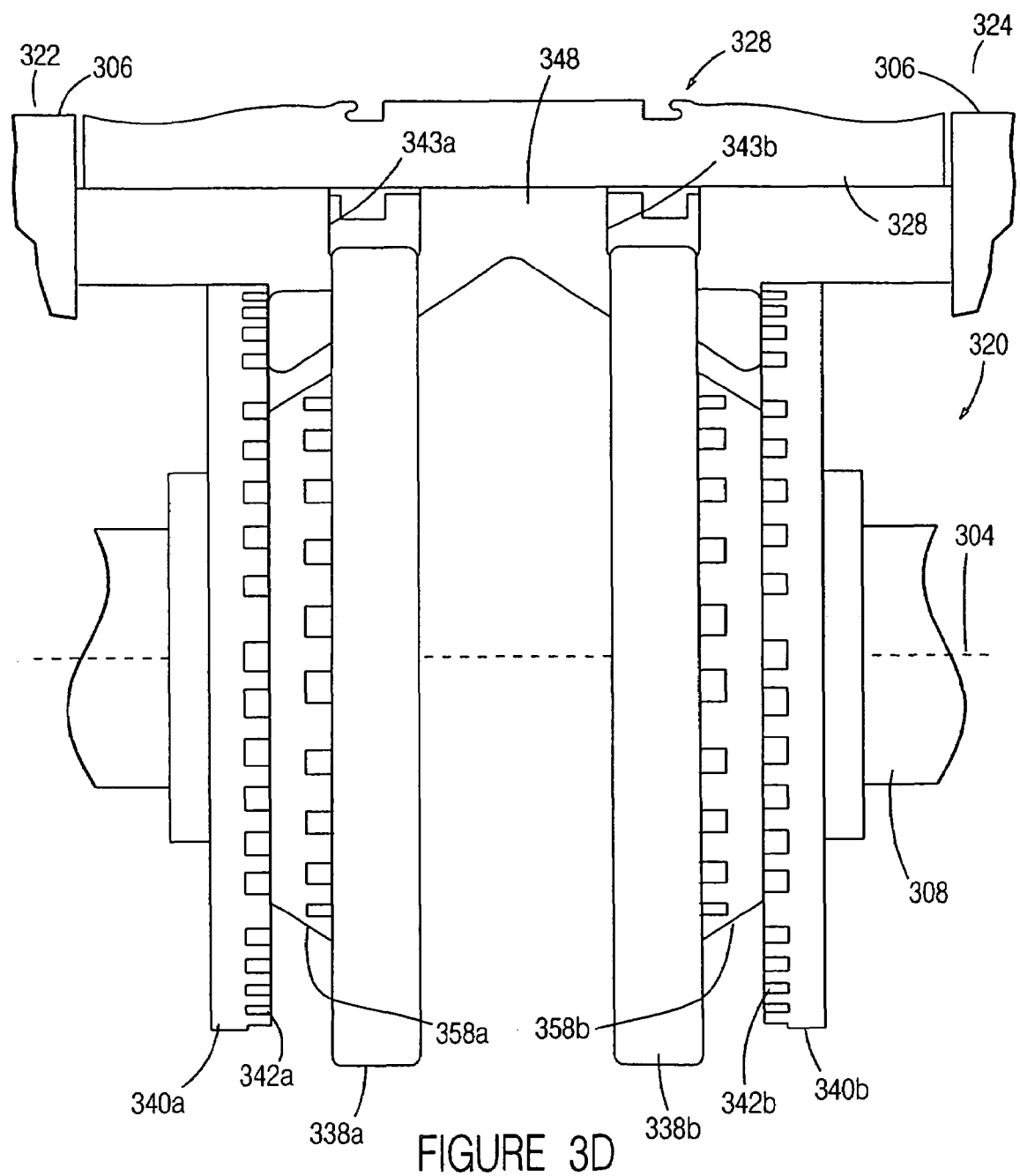
Figure 4C:
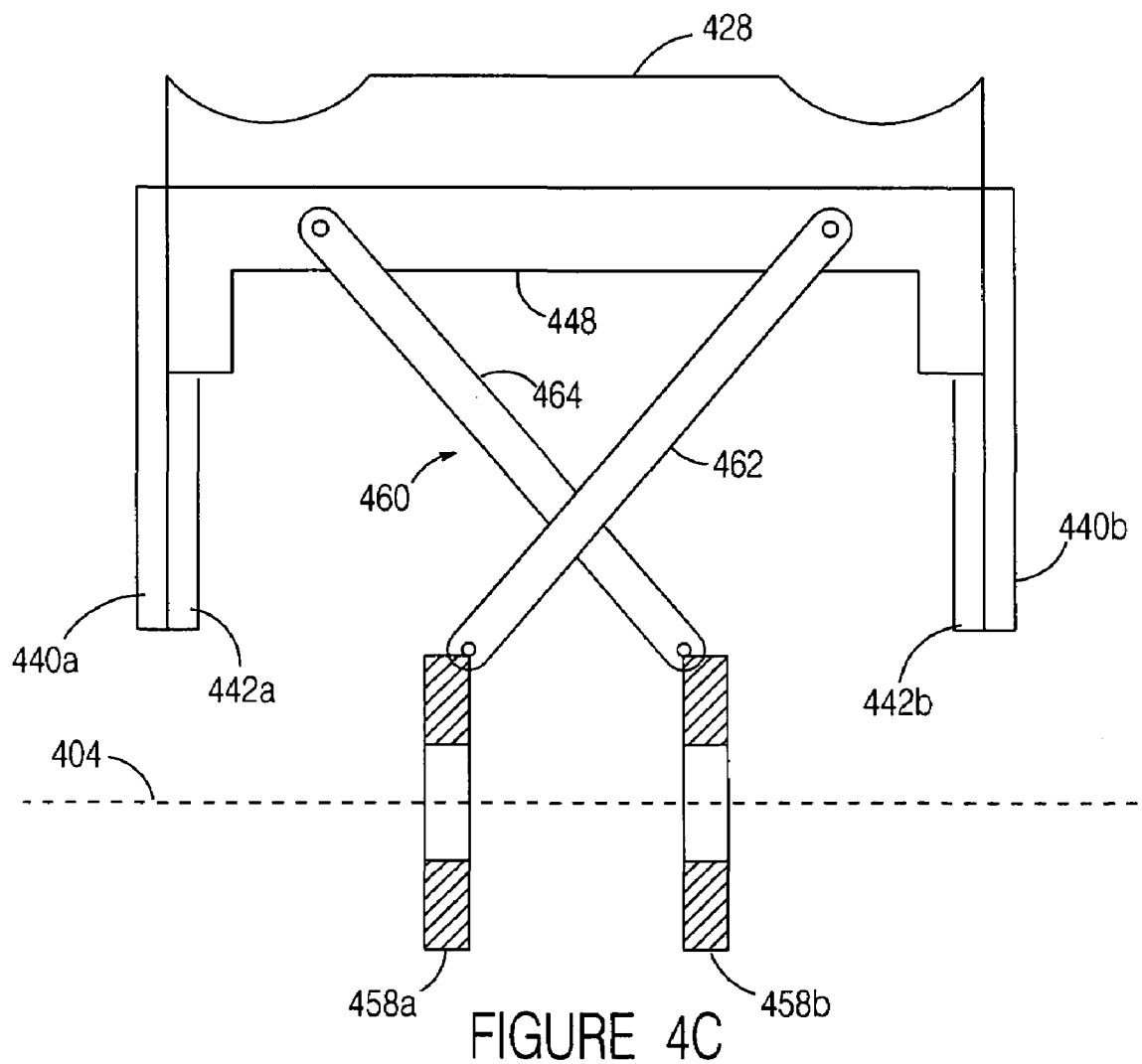
Figure 4D:
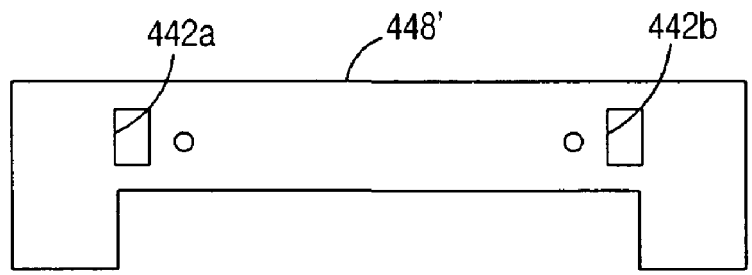
Figure 5:
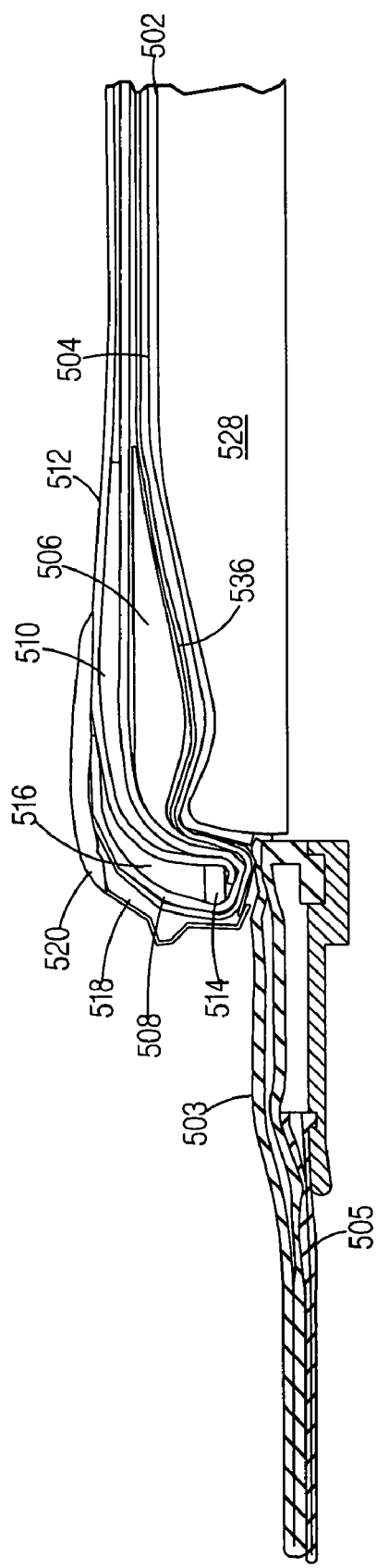

The structure, operation, and advantages of the present preferred embodiment of the invention will become further apparent upon consideration of the following description taken in conjunction with the accompanying drawings, wherein:

FIG. 1A is a schematic cross-sectional view of a tire building drum, with a tire carcass being laid up thereupon, according to the prior art;

FIG. 1B is a schematic cross-sectional view of a tire building drum, with a tire carcass being laid up thereupon, according to the prior art;

FIG. 2A is a perspective view of a tire building drum, according to the present invention;

FIG. 2B is a perspective view of a center section of the tire building drum of FIG. 2A, in a collapsed position (condition), according to the invention;

FIG. 2C is a cross-sectional view of the center section shown in FIG. 2B, according to the invention;

FIG. 2D is a perspective view of a center section of the tire building drum of FIG. 2A, in an expanded position (condition), according to the invention;

FIG. 2E is a cross-sectional view of the center section shown in FIG. 2D, according to the invention;

FIG. 2F is a perspective view of a typical expanding segment of the center section of the tire building drum of FIG. 2A, according to the invention;

FIG. 3A is a perspective view of the center section of a tire building drum, according to an embodiment of the invention;

FIG. 3B is a cross-sectional view of the center section of FIG. 3A, in a fully-collapsed condition;

FIG. 3C is a cross-sectional view of the center section of FIG. 3A, in a semi-expanded (or semi-collapsed) condition;

FIG. 3D is a cross-sectional view of the center section of FIG. 3A, in a fully-expanded condition;

FIG. 4A is a perspective view of the center section of a tire building drum, according to an alternate embodiment of the invention, showing the center section in a fully-collapsed condition;

FIG. 4B is a perspective view of the center section of a tire building drum, according to an alternate embodiment of the invention, showing the center section in a fully-expanded condition;

FIG. 4C is a schematic illustration of how the linkage mechanism of the alternate embodiment of FIG. 4A and FIG. 4B works, according to the invention;

FIG. 4D is a plan view of an alternate embodiment of a component of the linkage mechanism, according to the invention; and FIG. 5 is a partial cross-sectional view of a tire carcass laid up on a tire building drum, according to the invention.

DEFINITIONS

The following terms may be used throughout the descriptions presented herein and should generally be given the following meaning unless contradicted or elaborated upon by other descriptions set forth herein.

"Apex" (also "Bead Apex") refers to an elastomeric filler located radially above the bead core and between the plies and the turnup plies.

"Axial" and "axially" refers to directions that are on or are parallel to the tire's axis of rotation.

"Axial" refers to a direction parallel to the axis of rotation of the tire.

"Bead" refers to that part of the tire comprising an annular substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Breakers" or "tire breakers" refers to a belt or belt structure or reinforcement belts.

"Carcass" refers to the tire structure apart from the belt structure, tread, undertread over the plies and the sidewalls, but including the beads, plies, and, in the case of EMT or runflat tires, the wedge inserts sidewall reinforcements.

"Casing" refers to the carcass, belt structure, beads, sidewalls and all other components of the tire excepting the tread and undertread.

"Centerplane" refers to a plane intersecting a line which is normal to the plane at a point which is midway between two other points on the line. The line may be an axis of a cylindrical member, such as a tire building drum. A finished tire has a centerplane which is the "equatorial plane" of the tire.

"Chafer" refers to reinforcing material (rubber alone, or fabric and rubber) around the bead in the rim flange area to prevent chafing of the tire by the rim parts.

"Chipper" refers to a narrow band of fabric or steel cords located in the bead area whose function is to reinforce the bead area and stabilize the radially inwardmost part of the sidewall.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Cord" refers to one of the reinforcement strands, including fibers or metal or fabric, with which the plies and belts are reinforced.

"Crown" or "tire crown" refers to the tread, tread shoulders and the immediately adjacent portions of the sidewalls.

"EMT tire" refers to Extended Mobility Technology and EMT tire refers to a tire which is a "runflat", which refers to a tire that is designed provide at least limited operational service under conditions when the tire has little to no inflation pressure.

"Equatorial plane" refers to a the plane perpendicular to the tire's axis of rotation and passing through the center of its tread, or midway between the tire's beads.

"Gauge" refers generally to a measurement, and often to a thickness dimension.

"Inner liner" refers to the layer or layers of elastomer or other material that form the inside surface of a tubeless tire and that contain the inflating gas or fluid within the tire. Halobutyl, which is highly impermeable to air.

"Insert" refers to the crescent-shaped or wedge-shaped reinforcement typically used to reinforce the sidewalls of runflat-type tires; it also refers to the elastomeric non-crescent-shaped insert that underlies the tread; it is also called a "wedge insert."

"Lateral" refers to a direction parallel to the axial direction.

"Meridional profile" refers to a tire profile cut along a plane that includes the tire axis.

"Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Shoulder" refers to the upper portion of sidewall just below the tread edge.

"Sidewall" refers to that portion of a tire between the tread and the bead.

"Tire axis" refers to the tire's axis of rotation when the tire is mounted to a wheel rim and is rotating.

"Tread cap" refers to the tread and the underlying material into which the tread pattern is molded.

"Turn-up end" refers to a portion of a carcass ply that turns upward (i.e., radially outward) from the beads about which the ply is wrapped.

DETAILED DESCRIPTION OF THE INVENTION

Generally speaking, a conventional process for making a radial-ply automobile tire includes an intermediate step of disposing two annular inextensible beads, each comprising a cable of steel filaments encased in green rubber, over the other components of a green ("green" meaning as yet uncured and still tacky) tire carcass on a tire building drum. An annular cross-sectionally triangular rubber filler called an "apex" may be added. Portions of the ply components that extend beyond the beads are then turned up around the beads, forming "turn-ups". Then, the green carcass is typically removed from the tire building drum and mounted on a "second stage machine" where it is inflated (reshaped) to a toroidal shape, and its radially-outer surface is pressed against a tread and belt package. In subsequent steps, the green carcass is stitched (rolled with a roller) to remove air pockets and adhere internal surfaces together. The resulting assembly is inserted into a mold (vulcanizing press) to cure under heat (typically 350 degrees Fahrenheit) and pressure to become a finished tire.

FIG. 1A corresponds generally to FIG. 9 of Becker, and illustrates (schematically, and in a greatly simplified manner) an exemplary tire building drum 102 of the prior art. The drum 102 is generally cylindrical, having two ends 102a and 102b, an axis of rotation 104 extending between the two ends, and a cylindrical outer surface 106. A centerplane (CP) is indicated on the drawing, and is generally a plane which bisects a carcass being laid up on the tire building drum.

In a typical (again, greatly simplified, for illustrative clarity) tire buildup, an inner liner 108 is applied on the surface of the drum 102, and two tire sidewall insert components ("inserts") 110a and 110b (collectively referred to as "110") are disposed at longitudinally (axially) spaced apart positions on the inner liner 108, as shown. Next, a first ply 112 is disposed over the inner liner 108 and inserts 110. This results in a green tire carcass having a nominally cylindrical shape. However, as is evident from the illustration of FIG. 1A, the addition of the sidewall inserts 110 between the inner liner 108 and the ply 112 causes there to be two "bumps" (protrusions), which are regions of increased outside diameter ("OD"), in the outer surface of the carcass. As can be seen, these bumps protrude significantly upwardly from the outer surface of the tire building drum and create significant protrusions 18 in these areas. Subsequent tire components such as a second carcass ply are difficult to force into such a nonplanar contour. At the locations of the protrusions, air can be trapped within the tire, leading to the aforementioned problems.

Next, two beads 114a and 114b (collectively "114") are added to the tire carcass. Each bead 114 is a substantially inextensible circular hoop, having an inside diameter ("ID") which is substantially equal to or preferably only slightly greater than the OD of the ply 112 (in areas other than where there are bumps). The beads 114 are shown as being slightly axially outboard of the inserts 110, and are shown as having a round (versus hexagonal) cross-section for sake of illustrative clarity. A second ply (not shown) may be added to the carcass, and the outer end portions of the carcass may be turned up. Finally the carcass may be transferred to another (second stage) machine for adding a tread package, etc.

FIG. 1B corresponds generally to FIGS. 2–7 of Becker, and illustrates an alternate embodiment of an exemplary tire building drum 122 of the prior art. The drum 122 is generally cylindrical, having two ends 122a and 122b, an axis of rotation 124, and a generally cylindrical outer surface 126. The drum 122 differs from the drum 102 of FIG. 1A primarily by virtue of having annular recesses (pockets, grooves) 136a and 136b (collectively referred to as "136") in its outer surface at longitudinal (axial) positions corresponding to the positions of and related to the dimensions of inserts 130a and 130b (collectively referred to as "130") and extending about the circumference of the drum 122. In this example, the inner liner 128 is applied to the surface 126 of the drum 122. Then the inserts 130 are applied, and fit (nestle) down into the recesses 136. Then a ply 132 is applied. This results in a green tire carcass having a substantially cylindrical shape. In contrast to the tire carcass formed in FIG. 1A, the addition of the inserts 130 between the inner liner 128 and the ply 132 does not cause there to be two "bumps" in the outer surface of the carcass. Since there are substantially no bumps, and the outer surface of the tire carcass being laid up is substantially cylindrical, having a substantially uniform OD, it is (among other things) possible to mount two beads 134a and 134b (collectively referred to as "134") onto the carcass by sliding them both on from one end (e.g., 122a) of the drum 122.

FIGS. 2A through 2D illustrate, generally, the tire building drum 202 of the present invention. The drum 200 is generally cylindrical, having two ends 202a and 202b, an axis of rotation 204 extending between the two ends, and a cylindrical outer surface 206. The drum 202 has an overall axial length "L" between the two ends. A spindle (or drum support shaft) extends along the axis 204 and has an end 208a extending from the end 202a of the drum 202, and an end 208b extending from the end 202b of the drum 202.

The drum 202 has a center section 220 which is generally cylindrical, and centered about the axis 204. The center section 220 has a width (more properly, axial length) of $L_C$. The drum 202 has a first end section 222 which is coaxial with the center section 220, and which is disposed axially at one end of the center section 220. The drum 202 has a second end section 224 which is coaxial with the center section 220, and which is disposed axially at an opposite end of the center section 220. The two end sections 222 and 224 are, for purposes of the present invention, substantially identical to (i.e., mirror images of) one another, each having an axial length of $(L-L_C)/2$. The end sections 222 and 224 are axially-outward of the center section 220. The drum, more significantly the center section 220 of the drum, has a centerplane (compare CP, FIG. 1A), which is a plane intersecting the axis 204 midway between the ends of the center section (typically also midway between the ends 202a, 202b) of the overall drum. The axis 204 is, by definition, normal to the centerplane.

The center section 220 is circumferentially segmented, having a plurality of elongate fixed segments 226 alternating with a like plurality of elongate expanding segments 228. As best viewed in any of FIGS. 2B–2D, there are suitably 24 (twenty four) fixed segments 226 alternating with 24 (twenty four) expanding segments 228. The expanding segments 228 are axially-extending and circumferentially spaced from one another, and end portions of each is contoured to have annular recesses (pockets, grooves) 236a and 236b (collectively referred to as "236"; compare 136) in its outer surface at longitudinal (axial) positions corresponding to the positions of and related to the dimensions of sidewall inserts (not shown, compare 130) which will be applied during the carcass layup process, described hereinabove. The pockets 236 can best be viewed in FIG. 2F, wherein can also be viewed two turnup bladder (not shown) anchor points 238a and 238b in the outer surface of the expanding segment. In FIGS. 2F and 5A, it is seen that end portions of the expanding segments 238, 538 are contoured to have pockets 236, 536 for receiving components (e.g., sidewall inserts) of a tire carcass being laid up on the drum.

The fixed segments 226 are elongate, generally rectangular in cross-section and have a length substantially equal to $L_C$. The fixed segments 226 typically have a fixed width or have a width proportional to the number of total segments. The expanding segments 228 are also elongate, generally rectangular in cross section, and have a length substantially equal to $L_C$.

It is within the scope of the invention that there are any suitable number of fixed and expanding segments, for example, rather than twenty four of each, anywhere from eighteen to thirty of each. It is also within the scope of the invention that the number of fixed segments is not exactly equal to the number of expanding segments. It is also within the scope of the invention that the expanding segments do not all have the exact same width. The same applies to the fixed segments. Selected ones of the fixed and/or expanding segments can be "special purpose" segments, such as for communicating vacuum to an inner liner being laid up on the drum.

The center section 220 is expandable, between a collapsed (or retracted, or contracted) condition, shown in FIGS. 2B and 2C and an expanded (or extended) condition (or "fully" expanded position), shown in FIGS. 2D and 2E. Mechanisms for effecting expansion and collapse of the center section 220 are described hereinbelow, and accommodate partially expanding the center section to one (or more) "semi-expanded" positions. Generally, each of said expanding segments 228 is expandable from a first radius in the a collapsed condition of said drum to a second, greater radius in an expanded condition of said drum.

"Dual Cone" Mechanism for Expanding/Collapsing the Center Section

FIGS. 3A–3D illustrate the major components of an expandable center section 320 (compare 220) of a tire building drum, according to an embodiment of the invention. In the view of FIG. 3A, one of a plurality (e.g., 24) of expanding segments 328 (compare 228) is shown, and a corresponding one of a plurality (e.g., 24) of fixed segments 326 (compare 226) is shown. In FIGS. 3B–3D, the expanding segment 328 is shown, but not the fixed segment 326, for illustrative clarity. A spindle 308 is illustrated highly schematically in FIGS. 3B–3D, and is omitted from FIG. 3A, for illustrative clarity. A base member 346 for the fixed segment 326 is shown in FIG. 3A only, for illustrative clarity. A base (ramp) element 348 for the expanding segment 328 is best viewed in FIGS. 3B–3D.

Two guide elements (flanges) 340a and 340b (collectively referred to as "340") are disposed at axially spaced apart positions on a spindle 308 (compare 208) which extends along the axis 304. The flanges 340 are suitably in the form of generally planar discs which are centered on the axis 304, and are parallel with one another. Each flange 340 has an inner surface which faces, and is parallel with the inner surface of the other flange 340. The flanges 340 are essentially fixed to the spindle 308, which means that they will rotate with the spindle, and that they are at a fixed axial distance apart from one another. The flanges 340 are preferably centered about the centerplane. The flanges 340 are a distance apart which, as illustrated, is less than the length $L_C$ of the segments 326, 328.

The inner surfaces of the flanges 340a and 340b are provided with a plurality of radially-extending grooves 342a and 342b, respectively. A given groove 342a on the guide plate 340a corresponds to, and is at the same circumferential position on the spindle 308 as, a given groove 342b on the guide plate 340b. These two given grooves 342a, 342b form a given pair of grooves and, for example, there are 24 (twenty four) pairs of grooves, spaced at even intervals about the inner surfaces of the flanges 340. Each of these given pairs of grooves 342a, 342b function as a track for guiding an expanding segment support member (ramp element) 348 associated with an expanding segment 328, radially inward and outward, as discussed hereinbelow.

Each expanding segment 328 has a ramp element 348 associated therewith. (For 24 expanding segments 328, there are 24 ramp elements 348.) The ramp element 348 is essentially a flat planar element having four edges (sides)—a top edge for supporting the expanding segment 328, a bottom "ramped" edge which functions as a ramp surface for being acted upon by two movable wedge elements 358 (described in greater detail hereinbelow), a first side edge which rides in the groove 342a of a given groove pair, and a second side edge which rides in the groove 342b of the given groove pair. Preferably, the ramp element 348 is separate from the expanding segment 328, but it is within the scope of the invention that it is integrally formed therewith. In the case that the ramp element 348 is not formed integrally with the expanding segment 328, the expanding segment 328 may be attached in any suitable manner to the ramp element 348.

The inner surfaces of the flanges 340a and 340b are also provided with a plurality of radially-extending grooves 343a and 343b, respectively. Each of the radially-extending grooves 343a and 343b are interspersed between the radially-extending grooves 342a and 342b The radially-extending grooves 343a and 343b are shorter than the radially-extending grooves 342a and 342b. A given groove 343a on the guide plate 340a corresponds to, and is at the same circumferential position on the spindle 308 as, a given groove 343b on the guide plate 340b. These two given grooves 343a, 343b form a given pair of grooves and, for example, there are 24 (twenty four) pairs of grooves, spaced at even intervals about the inner surfaces of the flanges 340. Each of these given pairs of grooves 343a, 343b function as a track for receiving and securing a fixed segment support member 346 associated with a fixed segment 326, as discussed hereinbelow. The base member 346 is essentially a rectangular block, extending between grooves of the flanges and having four edges (sides)—a top edge for supporting the fixed segment 326, a first side edge which fits in a groove 343a, a second side edge which fits in a groove 343b, and a generally flat bottom edge. In the case of 24 (twenty four) fixed segments 326, there are 24 (twenty four) base members 346 extending between 24 pairs of grooves 343a, 343b. (The side edges of the base members are received in the grooves.) This accounts for the total overall number of grooves in each flange (and the total overall number of groove pairs in the flanges) being 48 (forty eight)—24 pairs of grooves for guiding the expanding segments 328 as they move radially in and out, and 24 pairs of grooves for locating the fixed segments 326 between the expanding segments 328 even though radial movement is not contemplated or required (to the contrary, the fixed segments are supposed to remain at selected radial positions). Preferably, the base member 346 is separate from the fixed segment 326, but it is within the scope of the invention that it is integrally formed therewith. In the case that the base member 346 is not formed integrally with the fixed segment 326, the fixed segment 326 may be attached in any suitable manner to the base member 346.

In FIG. 3A, it can be seen that the fixed segment 326 has an axial length which is substantially the same as the axial length of the expanding segment 328, and that the axial length $L_C$ of both is greater than the spacing between the two flanges 340, and that they are "centered" with regard to the flanges 340 (and the centerplane).

Two biasing members 338a and 338b (collectively referred to as "338") are provided. One of the biasing members, 338b) is shown in phantom in FIG. 3A. The other of the biasing members, 338a, is shown in phantom in FIGS. 3B–3D, for illustrative clarity. The biasing members 338 are disposed at axially spaced apart positions about the spindle 308, and are suitably in the form of rubber bands extending through corresponding holes 343a and 343b in each of the ramp elements 348. These rubber bands 338 exert a "collapsing" radial force on the ramp elements 348 in the direction of the axis 304. As shown in FIG. 3A, the base members 346 for the fixed segments 326 may also be provided with holes 344a and 344b, through which the rubber bands 338 extend.

Two tapered (wedge) elements 358a and 358b (collectively referred to as "358") are disposed at axially spaced apart positions on the spindle 308 (on either side of the centerplane). The wedge elements 358 are suitably in the form of generally planar discs (rings, since they are discs with a hole in the middle) which are centered on the axis 304, and are parallel with one another. The outer faces of the wedge elements 358 are tapered. Therefore, the wedge elements 358 are frustroconical, and may be referred to as "cones", or "cone-shaped elements", or "conical elements". The wedge elements 358 are not fixed to the spindle 308. Rather, although they may be keyed (or splined) to the spindle so that they will rotate with the spindle, they are free to move axially (traverse) along the spindle, towards and apart form one another, from a minimum distance (essentially touching one another), to a maximum distance from one another, remaining parallel with each other irrespective of the axial distance form one another.

In FIG. 3B, the center section 320 is shown in its collapsed (or "fully-collapsed") position. In this position, the wedge elements 358 are close together (e.g., essentially zero distance apart from one another, with their bases touching, or nearly touching), and the ramp element 348 and, consequently, the expanding segment 328 is at its minimal radial distance from the axis 304. In other words, the diameter of the center section 320 is at a minimum in this collapsed (retracted) position. In this collapsed position, the outer surface of the center section 320 has substantially the same diameter as that of the outer surfaces 306 (compare 206) of adjacent end sections 322 and 324 (compare 222, 224). In this collapsed position, a tire component, such as the inner liner (e.g., 504, see below) of a tire carcass, may be applied.

In FIG. 3C, the center section 320 is shown in its semi-expanded position. In this position, the wedge elements 358 are spread apart from one another (but not as far apart as they are capable of spreading), and the ramp element 348 and, consequently, the expanding segment 328 is at a greater radial distance from the axis 304. In other words, the diameter of the center section 320 is now larger, or expanded. In this semi-expanded position, the outer surface of the center section 320 has a slightly greater diameter than that of the outer surfaces 306 (compare 206) of adjacent end sections 322 and 324 (compare 222, 224). In this semi-expanded position, a tire component, such as the ply (e.g., 508, see below) of a tire carcass, may be applied.

In FIG. 3D, the center section 320 is shown in its fully-expanded position. In this position, the wedge elements 358 are spread (have moved) farther apart from one another (essentially as far apart as they are capable of spreading, their bases far apart from one another), and the ramp element 348 and, consequently, the expanding segment 328 is at an even greater radial distance from the axis 304. In other words, the diameter of the center section 320 is now even larger, or more expanded. In this fully-expanded position, the outer surface of the center section 320 has a much greater diameter than that of the outer surfaces 306 (compare 206) of adjacent end sections 322 and 324 (compare 222, 224). Concurrently with the drum in the fully-expanded position, separately actuated bead locks (not shown) cause the beads to be firmly set. Next, the ends of the carcass can then be turned up, in a final step of carcass construction. Then, the center section 320 of the drum can be partially collapsed (e.g., returned to a semi-expanded position), the bead locks collapsed and the carcass can be removed for further processing, such as the application of a tread package in a second stage tire building machine.

The two wedge elements 358 are in the form of cones (more accurately, frustroconical), disposed coaxially (having the same axis) with their bases opposing (facing) one another, and their apexes (albeit truncated) remote from one another. It is preferred that the two wedge elements 358 remain at all times, throughout their range of axial movement, equidistant from the centerplane of the center section 320 of the drum. The bottom edge (inner surface) of the ramp element 348 is V-shaped, with two intersecting ramp surfaces, one for each of the wedge elements 358. In this manner, forces exerted by the wedge elements 358 are evenly distributed along the length of the ramp element 348 and, consequently, the expanding segment 328. The angle along the outer edges (faces) of the wedge elements 358, and the corresponding angle along the inner edges (surfaces) of the ramp elements 348 is suitably between 20 degrees and 45 degrees, such as approximately 30 degrees, more particularly such as 33 degrees, with respect to the axis, or more parallel to the axis than perpendicular thereto. This angle, of course, remains constant irrespective of the axial positions of the wedge elements 358. As the wedge elements 358 move farther apart from one another, the expanding segments 328 are urged radially outward from the axis 304.

The expanding segment 328 has a length $L_C$. The fixed segment 326 has a length substantially equal to $L_C$. The flanges 340 are spaced apart a distance less than the length $L_C$. In the illustrations of FIGS. 3A–3D, a total of 48 (forty eight) grooves 342 are shown in each flange 340. As discussed hereinabove, 24 of these grooves on each flange form a given pair of grooves for guiding the ramp elements 348 as they are forced radially outward and return radially inward. As best viewed in FIG. 3A, the base member 346 extends between intermediate pairs of grooves 342 in the flanges 340. Also, the base members 346 must pass over (by, through) the wedge elements 358. Therefore, the wedge elements 358 have 24 notches 356 at evenly spaced circumferential positions about the outer surface of their respective bases for receiving a bottom edge of the base member 346 as it passes by. This serves to 'lock' the wedge elements 358 in fixed circumferential positional relationship with respect to the flanges 340, while allowing the wedge elements 358 to move axially back and forth in the space between the flange elements 340.

It is therefore seen that expansion of the center section 320 of a tire building drum can be accomplished using a traversing dual cone mechanism which exerts radial forces on the expanding segments 328 which are symmetrical about the centerplane of the drum (i.e., of the center section 320). With only one tapering structure, such as in U.S. Pat. No. 5,264,068, such symmetry cannot be accomplished. Applying expanding forces, with symmetry about the centerplane, can be critical to achieving uniformity in the layup of a tire carcass.

Although not shown, any suitable mechanism can be used for moving the tapered wedge elements axially 358 outward to effect expansion of the center section 320, and axially inward (towards one another) for permitting retraction of the center section 320.

Suitable dimensions for the center section 320 are:
diameter collapsed=400 mm
diameter semi-expanded=420 mm
diameter fully-expanded 476 mm (expansion of 76 mm)
minimum center section width ($L_C$) of 250 mm When the center section 320 is collapsed, the surface of the drum is substantially continuous, smooth, uninterrupted (flat), and this is advantageous for innerliner application. It is within the scope of the invention that means for providing a vacuum, through selected ones of the segments (either fixed or expanding), to the surface of the drum, to hold the innerliner securely thereon, be provided, in any suitable manner. When the center section is semi-expanded, the surface is also substantially flat, such as would be advantageous for ply application.

"Overlapping Linkage" Mechanism for Expanding/Collapsing the Center Section

FIGS. 4A–4C illustrate an alternate embodiment of a mechanism for expanding and collapsing the center section of a tire building drum. Whereas the embodiment of FIGS. 3A–3D used a dual cone and ramp mechanism for expansion, and rubber bands for collapsing the center section, in this embodiment the linkage is capable of both expanding and contracting the expanding segments of the center section.

FIGS. 4A–4C illustrate the major components of an expandable center section 420 (compare 320) of a tire building drum, according to an alternate embodiment of the invention. In the illustration of FIG. 4C, one of a plurality (e.g., 24) of expanding segments 428 (compare 328) is shown. In the views of FIGS. 4A and 4B, the expanding segment is omitted, for illustrative clarity. It will be understood that the general alternating arrangement of fixed and expanding segments is substantially the same in this embodiment as in the previously-described embodiment. In describing this embodiment, the fully-collapsed position of the center section 420 is shown in FIG. 4A, and the fully-expanded position of the center section 420 is shown in FIG. 4B. It will be understood that in this, as in the previous embodiment, the drum may be expanded (or collapsed) to any position (diameter) between fully-collapsed and fully-expanded. A spindle (compare 308) extends along the axis 404 of the drum, but it omitted, for illustrative clarity. Although not shown, the center section is provided with fixed segments (e.g., 326), in the same (or similar) manner as was the previously-described embodiment.

Two flanges 440a and 440b (collectively referred to as "440"; compare 340) are disposed at axially spaced apart positions on the spindle. The flanges 440 are substantially similar to the flanges 340 of the previous embodiment, and are suitably in the form of generally planar discs which are centered on the axis (304), and are parallel with one another. Each guide element 440 has an inner surface which faces, and is parallel with the inner surface of the other guide element 440. The flanges 440 are essentially fixed to the spindle (308), which means that they will rotate with the spindle (308), and that they are at a fixed axial distance apart from one another.

The inner surfaces of the flanges 440a and 440b are provided with a plurality of radially-extending grooves 442a and 442b, and 443a and 443b respectively. Again, this is comparable to the grooves 342a and 342b, and 343a and 343b, respectively of the previously-described embodiment.

A given groove 442a on the guide plate 440a corresponds to, and is at the same circumferential position on the spindle as, a given groove 442b on the guide plate 440b. These two given grooves 442a, 442b form a pair of grooves and, for example, there are 24 pairs of grooves, spaced at even intervals about the inner surfaces of the flanges. Each pair of grooves functions as a track for guiding an expanding segment support, or base (support) element 448 (compare 348) as it moves radially inward or outward from the axis, as discussed hereinbelow. Further, a given groove 443a on the guide plate 440a corresponds to, and is at the same circumferential position on the spindle as, a given groove 443b on the guide plate 440b. These two given grooves 443a, 443b form a pair of grooves and, for example, there are 24 pairs of grooves, spaced at even intervals about the inner surfaces of the flanges. Each pair of grooves functions as a track for securing base (support) element 446 (compare 346) which is secured to the fixed segments, as discussed hereinbelow.

Each expanding segment 428 has a support element 448 associated therewith. (For 24 expanding segments, there are 24 base members.) The support element 448 is essentially a flat planar element having four edges (sides)—a top edge for supporting the expanding segment 328, a first side edge which rides in the groove 442a of a given groove pair, and a second side edge which rides in the groove 442b of the given groove pair. The support element 448 also has a bottom edge, but the shape of that edge is of no particular importance (as contrasted with the bottom edge ramp surface of the ramp element 348). Preferably, the support element 448 is separate from the expanding segment 428, but it is within the scope of the invention that it is integrally formed therewith. In the case that the support element 448 is not formed integrally with the expanding segment 428, the expanding segment 428 may be attached in any suitable manner to the support element 448.

Two guide rings (hubs) 458a and 458b (collectively referred to as "458") are disposed at axially spaced apart positions on the spindle (on either side of the centerplane). The guide rings 458 are suitably in the form of generally planar discs (rings, since they are discs with a hole in the middle) which are centered on the axis 404, and are parallel with one another. The guide rings 458 are not fixed to the spindle. Rather, although they may be keyed (or splined) to the spindle so that they will rotate with the spindle, they are free to move axially along the spindle, towards and apart form one another, from a minimum distance (essentially touching one another), to a maximum distance from one another, remaining parallel with each other irrespective of the axial distance form one another.

An overlapping linkage mechanism 460 is provided between the guide rings 458 and the support element 448. The linkage mechanism comprises:

a first elongate link 462 having an end pivotally attached to a one (458a; left, as viewed) of the guide rings 458, and an opposite end pivotally attached adjacent (near) a one (right, as viewed) end of the support element 448; and a second elongate link 464 having an end pivotally attached to the other (458b; right, as viewed) of the guide rings 458, and an opposite end pivotally attached adjacent (near) an opposite (left, as viewed) end of the support element 448.

The links 462 and 464 overlap each other (cross over one another), but are not pivotally attached to each other, as would be the case with a "scissors" type linkage, nor are they parallel to each other, as would be the case with a two-link "toggle" type linkage.

In FIG. 4A (compare FIG. 3B) the center section 420 is shown in its collapsed (or "fully-collapsed") position. In this position, the guide rings 458 are spread far apart from one another (essentially as far apart as they are capable of spreading), and the support element 448 and, consequently, the expanding segment 428 is at its minimal radial distance from the axis 404. In other words, the diameter of the center section 420 is at a minimum in this collapsed position. In this collapsed position, the outer surface of the center section 420 has substantially the same diameter as that of the outer surfaces (306) of adjacent end sections (322, 324). In this collapsed position, the inner liner of a tire carcass may be applied.

In FIG. 4B (compare FIG. 3D), the center section 420 is shown in its fully-expanded position. In this position, the guide rings 458 are close together (e.g., essentially zero distance apart from one another), and the support element 448 and, consequently, the expanding segment 428 is at its greatest greater radial distance from the axis 404. In other words, the center section 420 is now fully-expanded. In this fully-expanded position, the outer surface of the center section 420 has a much greater diameter than that of the outer surfaces (306) of adjacent end sections (e.g., 222, 224). Concurrently with the drum in the fully-expanded position, separately actuated bead locks (not shown) cause the beads to be firmly set. Next, the ends of the carcass can then be turned up, in a final step of carcass construction. Then, the center section 420 of the drum can be partially collapsed (e.g., returned to a semi-expanded position), the bead locks collapsed and the carcass can be removed for further processing, such as the application of a tread package in a second stage tire building machine.

In the collapsed condition (FIG. 4A), the links 462 and 464 are both nearly parallel to the axis 404. For example, at an angle of 19.6 degrees with respect thereto. In the expanded condition (FIG. 4B), the links 462 and 464 are at an angle approximately halfway between parallel to and perpendicular to the axis 303, such as at an angle of 46.2 degrees with respect thereto. This provides for a relatively compact mechanism with a good operating range.

Although not shown, the center section can be expanded to any diameter between collapsed and fully-expanded, as determined by the spacing of the guide rings 458 from one another. For example, in a semi-expanded position, the ply of a tire carcass may be applied. It is preferred that the two guide rings 458 remain equidistant from the centerplane of the center section 420 of the drum while they are moving in their range of positions. In this manner, forces are evenly (symmetrically) distributed along the length ($L_C$) of the support element 448 and the expanding segment 428.

In this example, with the overlapping linkage, the relationship between guide ring spacing and center section diameter is inverse—the closer the guide rings are to one another, the greater the diameter of the center section. In the previous example (wedge/ramp), the relationship between guide rings spacing and center section diameter is direct—the closer the guide rings are to one another, the lesser the diameter of the center section. In either case however, the diameter of the center section 320 and 420 is proportional (directly or inversely, respectively) to the spacing between the wedge elements 358 or guide rings 458, respectively.

The overlapping linkage mechanism of FIGS. 4A–4C is superior to a toggle linkage, for example as shown in the aforementioned U.S. Pat. No. 4,929,298 with regard to being able to apply forces to the expanding segment in a manner which is symmetrical about the centerplane, throughout the range of expansion for the drum. A toggle linkage, wherein two links move in unison parallel to one another, is inherently not symmetrical about the centerplane. This symmetry, as in the previous (wedge) embodiment, can be of profound significance in achieving uniformity in the layup of the tire carcass.

The overlapping linkage embodiment of FIGS. 4A–4C is similar to the wedge/ramp embodiment of FIGS. 3A–3D, in the following regards:

both are for expanding and collapsing a center section (220, 320, 420) of a tire building drum;

both act upon expanding segments (228, 328, 428) of the center section;

both do not act upon the fixed segments (226, 326, 426) of the center section;

both employ flanges (340, 440) which have grooves (342, 442) for guiding a ramp element (348) or support element (448) which supports the expanding segment (328, 428);

both have elements (358, 458) which move axially to effect the expansion/collapse of the center section;

both exert expanding forces on the expanding segments in a manner which is symmetrical about the centerplane.

The symmetry of forces exerted (urged) upon the expanding segments, about the centerplane, is non-trivial. As mentioned above, a carcass ply which is lopsided (longer cords on one side of the tire than the other side) can cause a variety of tire nonuniformity problems including static imbalance and radial force variations. The present invention addresses one potential source of such nonuniformities—namely, imprecise (e.g., non-cylindrical) expansion of the drum.

In both embodiments, when the center section (320, 420) is collapsed, the surface of the drum is substantially continuous, smooth, uninterrupted (flat), and this is advantageous for innerliner application. It is within the scope of the invention that means for providing a vacuum, through selected ones of the segments (either fixed or expanding), to the surface of the drum, to hold the innerliner securely thereon, be provided, in any suitable manner. When the center section is semi-expanded, the surface is also substantially flat, such as would be advantageous for ply application. Both embodiments can use a roller screw system for center section expansion. The mechanism for moving the wedges 358 or guide rings 458 depends largely on other factors present in the overall drum construction, and can be adapted on a case-by-case basis.

The overlapping linkage embodiment of FIGS. 4A–4C is different from the wedge/ramp embodiment of FIGS. 3A–3D, in the following regards:

in the wedge/ramp embodiment, rubber bands (338) are used to collapse the center section (320);

in the overlapping linkage embodiment, the links (462, 464) themselves effect collapse of the center section;

in the wedge/ramp embodiment, the center section (320) expands when the wedges (358) move axially apart, and retracts when the wedges (358) move together.

in the overlapping linkage embodiment, the center section (420) expands when the guide rings (458) move closer together, and retracts when the guide rings (358) move farther apart.

The overlapping linkage design tends to provide more expansion range in a narrower width ($L_C$), allowing the minimum drum width to shrink, for example from 250 mm (for the wedge embodiment) to 200 mm (for the linkage embodiment).

Some exemplary dimensions for the center section (420 of the linkage embodiment are presented in the following table.

| Tire Size (in.) | 14 | 15 | 16 | 17 | 18 | 19 | 20 |
|---|---|---|---|---|---|---|---|
| Rim Dia (in.) | 14 | 15 | 16 | 17.2 | 18.2 | 19.2 | 20.2 |
| Expanded (mm) | 391 | 416 | 441 | 472 | 497 | 523 | 548 |
| Intermediate (mm) | 338 | 364 | 390 | 420 | 444 | 468 | 493 |
| Collapsed (mm) | 308 | 334 | 350 | 380 | 404 | 428 | 453 |
| expansion (mm) | 83 | 82 | 91 | 92 | 93 | 95 | 95 |

FIG. 4D illustrates an alternate embodiment of a support element 448' which is provided with two holes 442a and 442b (compare 342a and 342b) for receiving biasing members comparable to the biasing members 338 shown in FIGS. 3A–3D. The biasing members, suitably in the form of rubber bands, would exert a "collapsing" radial force on the support element 448'.

Extended Mobility Tires

FIG. 5 is a partial cross-sectional view of an exemplary tire carcass as it is laid up on a tire building drum, according to the invention. An end of an expanding segment 528 is shown. First, First, a center sleeve 502 is installed on the surface of the drum and extends over the expanding segment 528. An upper turnup bladder 503 and a lower turnup bladder 505 extends beyond the drum. The tire carcass comprises the following major components, in the following order:

an innerliner 504;
a first sidewall insert (pillar) 506;
a first ply (ply 1) 508;
a second sidewall insert (post) 510;
a second ply (ply 2) 512;
a bead 514;
an apex 516;
a chafer 518; and
a sidewall 520.

Other components, such as chipper, gum toeguard and fabric toeguard may be added to the carcass, as may be desired, but form no special part of the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A tire building drum having an axis and a centerplane intersecting the axis, comprising:

a plurality of axially extending, circumferentially spaced-apart expanding segments, each of said expanding segments being expandable from a first radius in a collapsed condition of said drum to a second radius in an expanded condition of said drum;

a pair of flanges centered about the axis at a fixed distance from one another;

a plurality of ramp elements, each supporting an expanding segment, disposed between the flanges and radially guided between the flanges;

two conical elements, each disposed coaxially between the pair of flanges, axially moveable therebetween, and having a tapered face;

wherein the tapered face of each of the two conical elements engages an inner surface of the ramp elements for forcing the expanding segments radially outward from the axis;

characterized in that:

there are two conical elements, each frustoconical disposed coaxially with their bases facing each other; and the inner surfaces of the ramp elements are V-shaped; and a plurality of base members supporting a plurality of fixed segments;

in each flange, a first plurality of grooves for receiving opposite side edges of the plurality of base members.

2. Tire building drum, according to claim 1, wherein when the conical elements move farther apart from one another, they urge the ramp elements radially outward from the axis.

3. Tire building drum, according to claim 1, further comprising:

in each flange, a second plurality of grooves disposed on an inner surface thereof and extending radially from the axis, for radially guiding the plurality of ramp elements.

4. Tire building drum, according to claim 1, wherein:

the expanding segments, ramp elements, flange and conical elements are all located in a center section of the drum.

5. Tire building drum, according to claim 1, wherein:

both of the two conical elements exerts a force on each of the ramp elements.

6. Tire building drum, according to claim 5, wherein:

the forces exerted by each of the two conical elements are symmetrical about the centerplane.

7. Tire building drum, according to claim 1, further comprising:

a plurality of fixed segments disposed between the plurality of expanding segments.

8. Tire building drum, according to claim 1, wherein:

end portions of the expanding segments are contoured to have pockets for receiving components of a tire carcass being laid up on the drum.

9. Tire building drum, according to claim 1, further comprising:

biasing members exerting a collapsing radial force on the ramp elements.

10. A tire building drum having an axis and a centerplane intersecting the axis, comprising:

a plurality of axially extending, circumferentially spaced-apart expanding segments, each of said expanding segments being expandable from a first radius in a collapsed condition of said drum to a second radius in an expanded condition of said drum;

a pair of flanges centered about the axis at a fixed distance from one another;

a plurality of ramp elements, each supporting an expanding segment, disposed between the flanges and radially guided between the flanges;

two conical elements, each disposed coaxially between the pair of flanges, axially moveable therebetween, and having a tapered face;

wherein the tapered face of each of the two conical elements engages an inner surface of the ramp elements for forcing the expanding segments radially outward from the axis;

characterized in that:

there are two conical elements, each frustoconical disposed coaxially with their bases facing each other;

the inner surfaces of the ramp elements are V-shaped;

a plurality of base members supporting a plurality of fixed segments;

in each flange, a first plurality of grooves for receiving opposite side edges of the plurality of base members; and the conical elements have notches at circumferential positions about the outer surface of their respective bases for receiving a bottom edge of the base members.

* * * * *